Patented July 4, 1950

2,514,209

UNITED STATES PATENT OFFICE 2,514,209

VULCANIZED RUBBER RESISTANT TO FLEX CRACKING AND METHOD OF PRODUCING SAME

Joseph C. Ambelang, Akron, Ohio, assignor to The Firestone Tire & Rubber Company, Akron, Ohio, a corporation of Ohio No Drawing. Application April 9, 1947, Serial No. 740,467

4 Claims. (Cl. 260—810)

This invention relates to flex-cracking inhibitors for natural rubber. More particularly, it relates to the use of formaldehyde derivatives of dialkyl phenols for that purpose. The preferred inhibitors are formaldehyde reaction products of paratertiary-alkyl meta-cresols.

There have been many antioxidants proposed for natural rubber, and some have a decided inhibiting effect on flex cracking. However, the compounds in general commercial use discolor light-colored rubber compositions, such as the white side walls of automobile tires. The compounds of this invention not only have general antioxidant properties but are particularly valuable as inhibitors of flex cracking and discolor the light-colored rubber compositions little, if any. The amount of the inhibitor employed will vary but, in general, from 0.1 to 10 per cent on the weight of the rubber will give satisfactory results. The inhibitor is usually milled into the rubber at the same time other compounding ingredients are milled into it.

The stabilizers of this invention are viscous, syrupy, alkali-catalyzed condensation products of 3 to 4 moles of formaldehyde and 6 moles of a phenol having the following general formula:

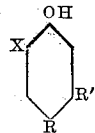

in which R is an alkyl radical containing at least three carbon atoms, R' is any alkyl radical, and X is hydrogen or an alkyl radical containing anywhere from one up to eight or more carbon atoms. These are the relatively low-molecular-weight reaction products obtained with limited polymerization. It is probable that the reaction products are alkylol derivatives of the substituted phenols although this has not been proven. Representative phenols are:

4-tertiary-butyl-3-methyl-phenol
4,6-di-tertiary-butyl-3-methyl-phenol
4-amyl-3-methyl-phenol
4-hexyl-3-methyl-phenol
4-octyl-3-methyl-phenol
4-butyl-3-ethyl-phenol
4-propyl-6-butyl-3-methyl-phenol The preferred reaction products are prepared from 3,4-dialkyl phenols and formaldehyde. The following examples are illustrative of the preparation of the inhibitors:

Example 1

Two moles (440 grams) of 4,6-di-tertiary-butyl-meta-cresol with 1.32 moles (39.6 grams) of formaldehyde (as 35 per cent aqueous solution) and 100 grams of 10 per cent aqueous sodium hydroxide were stirred mechanically for 15 hours at room temperature or slightly above, e. g., 40° C. At the end of this period the resulting suspension was made slightly acid with acetic acid, and the product was separated from the aqueous layer. The reaction product was purified by being taken up in benzene, the solution dried over calcium chloride, and the solvent removed by distillation under reduced pressure. The product was a viscous syrup weighing 95 per cent of the original phenol. Viscosity 44.5 poises at 23° C.

Example 2

Two moles (328 grams) of 4-tertiary-butyl-meta-cresol with 1 mole (30 grams) of formaldehyde (as 35 per cent aqueous solution) and 0.2 mole of sodium hydroxide (as 10 per cent aqueous solution) were stirred at room temperature for 15 hours. The reaction mixture was neutralized with acetic acid, and the product extracted with benzene. The extract was dried over anhydrous magnesium sulfate and the solvent removed by distillation under reduced pressure. The product was a viscous syrup weighing 107 per cent of the cresol used. It has a viscosity of 56.2 poises at 23° C. The cresol required 5.4 seconds to flow through a viscosimeter pipette; the product required 1470 seconds.

The inhibitors are preferably milled into the rubber during compounding but may be dispersed in a natural rubber latex before coagulation and drying if preferred. The materials are substantially nondiscoloring; that is, white stocks containing them do not discolor on exposure to natural or artificial weathering. The following tables illustrate the effect of different inhibitors of this invention in natural rubber which is heavily loaded with zinc oxide and titanium dioxide and might be used for a white side-wall tire. The inhibitors used in the formula are those prepared according to the preceding examples.

|  | Example 1 | Example 2 | Control |
|---|---|---|---|
| Pale crepe | 100 | 100 | 100 |
| Wax | 2 | 2 | 2 |
| Ultramarine | 0.1 | 0.1 | 0.1 |
| Zinc oxide | 72 | 72 | 72 |
| Titanium dioxide | 20 | 20 | 20 |
| Sulfur | 3.1 | 3.1 | 3.1 |
| Accelerator | 0.4 | 0.4 | 0.4 |
| Activator | 0.5 | 0.5 | 0.5 |
| 3-Methyl-4,6-di-tertiary-butyl-phenol-formaldehyde reaction product | 1 | | |
| 3-Methyl-4-tertiary-butyl-phenol-formaldehyde reaction product | | 1 | |

The wax used was a usual grade of blooming wax used in white side-wall tires. The accelerator was a common accelerator, and the activator was a usual activator of acceleration.

Four strips of each of the compounds cured for 20, 40, and 60 minutes, respectively, at 280° F. were tested on a flexing machine using ½-inch dumbbell strips of 0.100-inch gauge. In the following table the total flex life of the various strips is recorded in hours under the heading "Flex Life," and under the heading "Crack Formation" the average rate of crack formation—that is, the number of cracks formed per hour—is recorded:

| Product | Flex Life | Crack Formation |
|---|---|---|
|  | Hours |  |
| Example 1 | 57.45 | 4.2 |
| Example 2 | 49.82 | 6.0 |
| Control | 36.77 | 10.8 |

Samples of each were then tested under natural weathering conditions and in a weatherometer. The results of 8 weeks' natural weathering are compared in the following table with the results of 4 hours' artificial weathering. It will be noted that the stocks containing the inhibitor gave no appreciable discoloration.

| Example | Color after 8 Weeks' Weathering | Color after 4 Hours' Weatherometer |
|---|---|---|
| Example 1 | white | white. |
| Example 2 | do | Do. |
| Blank | do | Do. |

These examples are illustrative only and are not to be considered in a limiting sense. Variations from the disclosure are permissible within the scope of the appended claims.

The new reaction products and their preparation are covered in my pending application Serial No. 641,007.

What I claim is:

1. Sulfur-cured natural rubber which contains as a flex-cracking inhibitor a relatively small amount of a viscous, syrupy, alkali-catalyzed, low-molecular-weight condensation product of 3 to 4 moles of formaldehyde and 6 moles of an alkyl phenol of the following formula

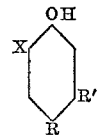

in which R is an alkyl radical containing three to eight carbon atoms, R' is an alkyl radical of the group consisting of methyl and ethyl, and X is selected from the group consisting of hydrogen and alkyl radicals containing one to eight carbon atoms, said alkyl radicals being monovalent aliphatic hydrocarbon radicals.

2. Sulfur-cured natural rubber which contains as a flex-cracking inhibitor a relatively small amount of a viscous, syrupy, alkali-catalyzed, low-molecular-weight condensation product of 2 moles of formaldehyde and 3 moles of 3-methyl-4,6-di-tertiary-butylphenol.

3. Sulfur-cured natural rubber which contains as a flex-cracking inhibitor a relatively small amount of a viscous, syrupy, alkali-catalyzed, low-molecular-weight condensation product of 1 mole of formaldehyde and 2 moles of 3-methyl-4-tertiary-butylphenol.

4. The method of producing a vulcanized natural rubber article resistant to flex-cracking which comprises heating natural rubber compounded with vulcanizing ingredients including sulfur and as a flex-cracking inhibitor a relatively small amount of a viscous, syrupy, alkali-catalyzed, low-molecular-weight condensation product of 3 to 4 moles of formaldehyde and 6 moles of an alkyl phenol of the following formula

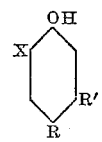

in which R is an alkyl radical containing three to eight carbon atoms, R' is an alkyl radical of the group consisting of methyl and ethyl, and X is selected from the group consisting of hydrogen and alkyl radicals containing one to eight carbon atoms, said alkyl radicals being monovalent aliphatic hydrocarbon radicals.

JOSEPH C. AMBELANG.

REFERENCES CITED

The following references are of record in the file of this patent:

UNITED STATES PATENTS

| Number | Name | Date |
|---|---|---|
| 2,356,929 | Hart | Aug. 29, 1944 |
| 2,375,964 | Turkington | May 15, 1945 |
| 2,445,735 | Kitchen | July 20, 1948 |

FOREIGN PATENTS

| Number | Country | Date |
|---|---|---|
| 413,012 | Great Britain | July 12, 1934 |

OTHER REFERENCES

Ser. No. 357,662, Wildschut (A. P. C.), published April 20, 1943.